(12) United States Patent
Lesser et al.

(10) Patent No.: US 12,406,430 B1
(45) Date of Patent: Sep. 2, 2025

(54) SYSTEMS AND METHODS FOR SELECTIVE NON-UNIFORM SPLAT GENERATION

(71) Applicant: Illuscio, Inc., Culver City, CA (US)

(72) Inventors: Stephen Lesser, Wellington (NZ); Joseph Nordling, Roeland Park, KS (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 19/225,630

(22) Filed: Jun. 2, 2025

(51) Int. Cl.
*G06T 15/08* (2011.01)
*G06T 7/40* (2017.01)
*G06T 15/20* (2011.01)

(52) U.S. Cl.
CPC ............. *G06T 15/08* (2013.01); *G06T 7/40* (2013.01); *G06T 15/20* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 2023/0281913 A1* | 9/2023 | Rematas | G06T 7/55 345/419 |
| 2025/0209740 A1* | 6/2025 | Revaud | G06T 3/14 |

OTHER PUBLICATIONS

Wang et al.; "Gaussian Splatting in Mirrors: Reflection-Aware Rendering via Virtual Camera Optimization;" 2024; arXiv preprint arXiv:2410.01614; pp. 1-13 (Year: 2024).*

* cited by examiner

*Primary Examiner* — Peter Hoang
(74) *Attorney, Agent, or Firm* — Ansari Katiraei LLP; Arman Katiraei; Sadiq Ansari

(57) ABSTRACT

A splat generation system and associated methods generate a splat representation of a three-dimensional (3D) model with varying detail based on an unequal or non-uniform capture of the 3D model. The system receives the 3D model. The system analyzes variation in the position or visual characteristics of the 3D model primitives, attributes different levels-of-importance to different surfaces or regions of the 3D model based on the variation, and defines a non-uniform placement of virtual cameras around the 3D model according to the different levels-of-importance that are attributed to the different surfaces or regions of the 3D model. The system generates the splats for the splat representation that reconstruct the different surfaces or regions with differing amounts of detail that match the detail captured for the different surfaces or regions in images generated from the non-uniform placement of the virtual cameras.

20 Claims, 7 Drawing Sheets

US 12,406,430 B1

SYSTEMS AND METHODS FOR SELECTIVE NON-UNIFORM SPLAT GENERATION

BACKGROUND

Gaussian splatting includes obtaining a set of images that capture a three-dimensional (3D) model from different viewpoints, reconstructing the 3D model by determining the relative positions of the cameras used to capture the set of images, and iteratively generating and refining different sets of splats until a particular set of splats matches with an acceptable amount of loss the visual detail in the different viewpoints of the 3D model captured by the set of images. Gaussian splatting is computationally expensive because the set of splats generated at each iteration is rendered and the resulting visualization is compared against the set of images in order to determine the amount of loss and/or refinements or changes to make in a subsequent iteration. The complexity increases according to increasing amounts of detail that are captured in the reference images. For instance, more spalt generation and refinement iterations are needed when the set of images capture the 3D model at higher resolutions or with equal detail across all surfaces regardless of the surface importance or whether or not viewers focus on those surfaces. In other words, the time and cost associated with Gaussian splatting is directly related to the amount of detail that is captured in the set of reference images from which the splats are generated.

Converting the 3D model from another format (e.g., a mesh, polygonal, or point cloud format) to the splat representation typically includes generating a uniform splat representation of the 3D model based on reference images that uniformly capture the surfaces or regions of the 3D model with equal detail. A fixed camera rig is typically used to equally capture the surfaces or regions of the 3D model.

FIG. 1 illustrates a prior art example of uniformly imaging a 3D model for conversion to a splat representation. Virtual cameras are placed equally around the 3D model to capture all surfaces of the 3D model with the same amount of detail and/or coverage. The images captured from this equal distribution of cameras are provided as the training or reference data for the splatting technique. The splatting technique generates splats that recreate the equally captured amounts of details from the images for all surfaces or regions of the 3D model. In other words, the splats that represent the boots of the 3D character are generated with the same detail as the splats representing the 3D character face due to the equal amount of coverage and detail for the boots and face in the captured images.

DETAILED DESCRIPTION OF PREFERRED EMBODIMENTS

Figure 1:
FIG. 1 illustrates a prior art example of uniformly imaging a three-dimensional (3D) model for conversion to a splat representation.

The following detailed description refers to the accompanying drawings. The same reference numbers in different drawings may identify the same or similar elements.

Provided are systems and associated methods for selective non-uniform splat generation. The selective non-uniform splat generation involves dynamically determining different levels-of-importance for different surfaces or regions of a three-dimensional (3D) model that is to be converted to a splat representation without the time and cost associated with rendering the 3D model and/or analyzing rendered visualizations of the 3D model. A splat generation system defines a virtual camera rig with unequal camera placement based on the different levels-of-importance associated with the different surfaces or regions. The unequal camera placement provides greater coverage for the surfaces or regions with greater levels-of-importance and lesser coverage for the surfaces or regions with lower levels-of-importance, wherein the amount of coverage corresponds to the number of different perspectives with which a surface or region is imaged and/or the amount of detail that is preserved from imaging the 3D model with the unequal camera placement. In other words, the splat generation system sets the camera positions about the virtual camera rig to capture more detail, more perspectives, and/or greater sampling of the dynamically determined important surfaces and regions and to capture with less detail, fewer perspectives, and/or lesser sampling of the dynamically determined lesser important surface and regions of the 3D model. The splat generation system generates the non-uniform splat representation of the 3D model based on the images that are captured from the unequal camera placement. In particular, the splat generation system modifies the spalt generation and refinement iterations of the splatting technique so that different sets of splats are generated to reconstruct different surfaces or regions of the 3D model according to the non-uniform detail that is captured for those different surfaces or regions in the images.

The selective non-uniform splat generation significantly reduces the time to train and/or generate the splat representation of the 3D model relative to traditional splatting techniques that generate a uniform splat representation of the 3D model based on an equal placement of cameras that captures all surfaces or regions of the 3D model with the same uniform detail. In particular, the selective non-uniform splat generation performed by the splat generation systems generates the splat representation in less time and in fewer splatting iterations as a result of having to generate fewer splats to reconstruct the less important regions with less detail. The fewer splatting iterations are needed to reconstruct the surfaces or regions that are dynamically determined to have lower levels-of-importance because the lower levels-of-importance results in those surfaces or regions receiving lesser coverage in the images and the lesser coverage yields less detail that is recreated or matched in fewer splatting iterations. The generated selective non-uniform splat representation is optimized for streaming across data networks due to having a smaller overall size and fewer splats than a uniform splat representations of the same 3D model.

Figure 2:
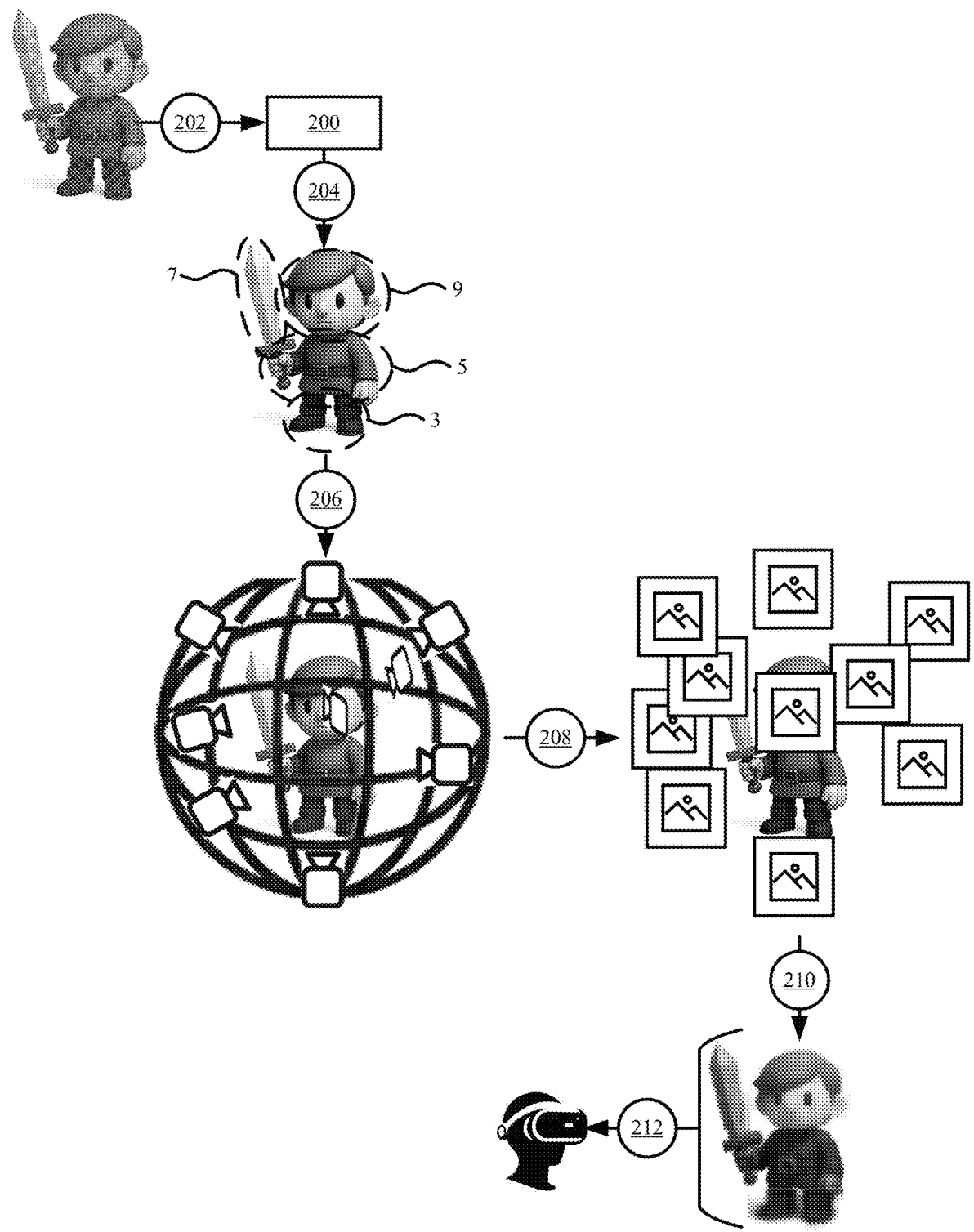
FIG. 2 illustrates an example of selective non-uniform splat generation in accordance with some embodiments presented herein.

FIG. 2 illustrates an example of selective non-uniform splat generation in accordance with some embodiments presented herein. Splat generation system 200 receives (at 202) a 3D model for conversion to an optimized Gaussian splat or other splat format. The 3D model may be encoded in a non-splat format such as a mesh model with a connected set of meshes or polygons that construct the 3D shape and visual characteristics of one or more objects or environments represented by the 3D model. Alternatively, the 3D model may be defined as a point cloud with a distributed and disconnected set of points that construct the 3D shape and visual characteristics of the one or more objects or environments represented by the 3D model. In some embodiments, the 3D model may be defined as implicit surfaces or with other 3D primitives. In some embodiments, the 3D model may be defined as an unoptimized Gaussian splat format with a high resolution that is to be reduced without noticeable quality loss in the optimized Gaussian splat. In some embodiments, the 3D model is defined with multiple types of 3D primitives. For instance, the 3D model may be defined using a combination of splats, points, and/or meshes.

Splat generation system 200 analyzes (at 204) the 3D primitive definition of the 3D model to differentiate between important regions and less important regions of the 3D model. The analysis (at 204) may be performed in a computationally efficient manner that does not involve rendering the 3D model and performing image classification. In some embodiments, the analysis (at 204) is based on the density, shape complexity, distribution, and/or variation of the 3D primitives. The density, shape complexity, distribution, and/or variation may be used to determine the coverage, geometric, material, and/or creative importance for different surfaces formed by the 3D primitives or different sets of 3D primitives in different regions of the 3D model. For instance, a region with lots of visual variation (e.g., changing shapes and colors) may be indicative of a visually interesting or important region of the 3D model, where as a region with visual commonality (e.g., flat shape with color commonality) may be indicative of a less interesting or less important region of the 3D model.

Splat generation system 200 selectively places (at 206) virtual cameras about a virtual camera rig that encompasses the 3D model based on the analysis (at 204). The selective placement (at 206) includes placing a virtual camera for a single perspective capture of the less important regions of the 3D model and placing two or more virtual cameras for a multiple perspective capture of the more important regions. The multiple perspective capture includes capturing multiple images of the same surface from different perspectives so that detail that may not be visible or differentiable from one perspective is captured from another perspective where it is visible or differentiable. As a result, the multiple perspective capture preserves more detail and fidelity than the single perspective capture. In some embodiments, splat generation system 200 may use an optimizer to determine the optimal placement (at 206) of the virtual camera based on a set of constraints (e.g., a maximum number of cameras for capturing the entirety of the 3D model, a minimum amount of coverage for each region or surface of the 3D model, etc.).

Splat generation system 200 performs (at 208) a non-uniform capture of the 3D model based on the selective placement (at 206) of the virtual camera. The non-uniform capture includes imaging the surfaces or regions of the 3D model in an unequal manner whereby regions or surfaces with higher levels-of-importance receive more coverage (e.g., are captured in more images from different perspectives) than regions or surfaces with lower levels-of-important. Accordingly, the non-uniform capture preserves more detail and provides a greater sampling of the important regions or surfaces than the less important regions or surfaces of the 3D model.

Splat generation system 200 generates (at 210) the splats for a splat representation of the 3D model based on the different levels-of-detail with which the different surfaces or regions of the 3D model are captured in the images produced from non-uniform capture of the 3D model. Splat generation system 200 generates (at 210) the splats to reconstruct and/or preserve the detail that is captured for the different surfaces or regions from the different perspectives of the images.

Generating (at 210) the splats may include inputting the images into a neural network or radiance field modeler. The neural network determines the positions at which the images were taken, generates a set of splats to reconstruct the visual detail for the different 3D model surfaces or regions in the images, computes an amount of loss between the set of splats and the images, and iteratively refines the set of splats with new splats, repositioned splats, redefined splats, and/or other changes until the set of splats recreate the 3D model detail captured across the images.

The splats differ from the 3D primitives of the received (at 202) 3D model. Each splat may be defined with (x,y,z) coordinates, a scaling value for the radius or shape of the splat, orientation or rotational information, a covariance matrix, and/or spherical harmonics that represent the visual characteristics of the splat.

Splat generation system 200 generates (at 210) the splats with non-uniform detail or quality to match the non-uniform detail or quality with which the surfaces or regions of the 3D model are captured in the images. Specifically, the important regions of the 3D model will be defined with a greater number of smaller-sized splats to recreate the higher level of detail with which those important regions are imaged and the less important regions of the 3D model will be defined with lesser number of larger-sized splats to recreate the lower level of detail with which those less important regions are imaged. In particular, the smaller-sized splats are able to recreate more fine detail and variation from the original surfaces of the 3D model than the larger-sized splats. For instance, a hundred splats may be offset from one another to represent a jagged or non-smooth surface. One hundred splats positioned about the same plane to represent a flat smooth surface would be unnecessary and provide no gain in the visual quality. Accordingly, the non-uniform splat generation preserves the detail and quality where users are likely to look (e.g., the surfaces or regions with the higher levels-of-importance) and where the detail and quality has the greatest impact on the 3D model visualization and reduces the overall size of the splat representation by using fewer splats where there is reduced detail or quality or where the detail or quality has less impact on the 3D model visualization.

Splat generation system 200 presents (at 212) the generated set of splats in response to a request to access or view the 3D model. Presenting (at 212) the generated set of splats may include streaming the splat representation instead of the original encoding of the 3D model to a requesting user device over a data network. The splat representation is optimized for streaming relative to the original encoding since the splat representation has a significantly reduced size relative to the original encoding.

Figure 3:
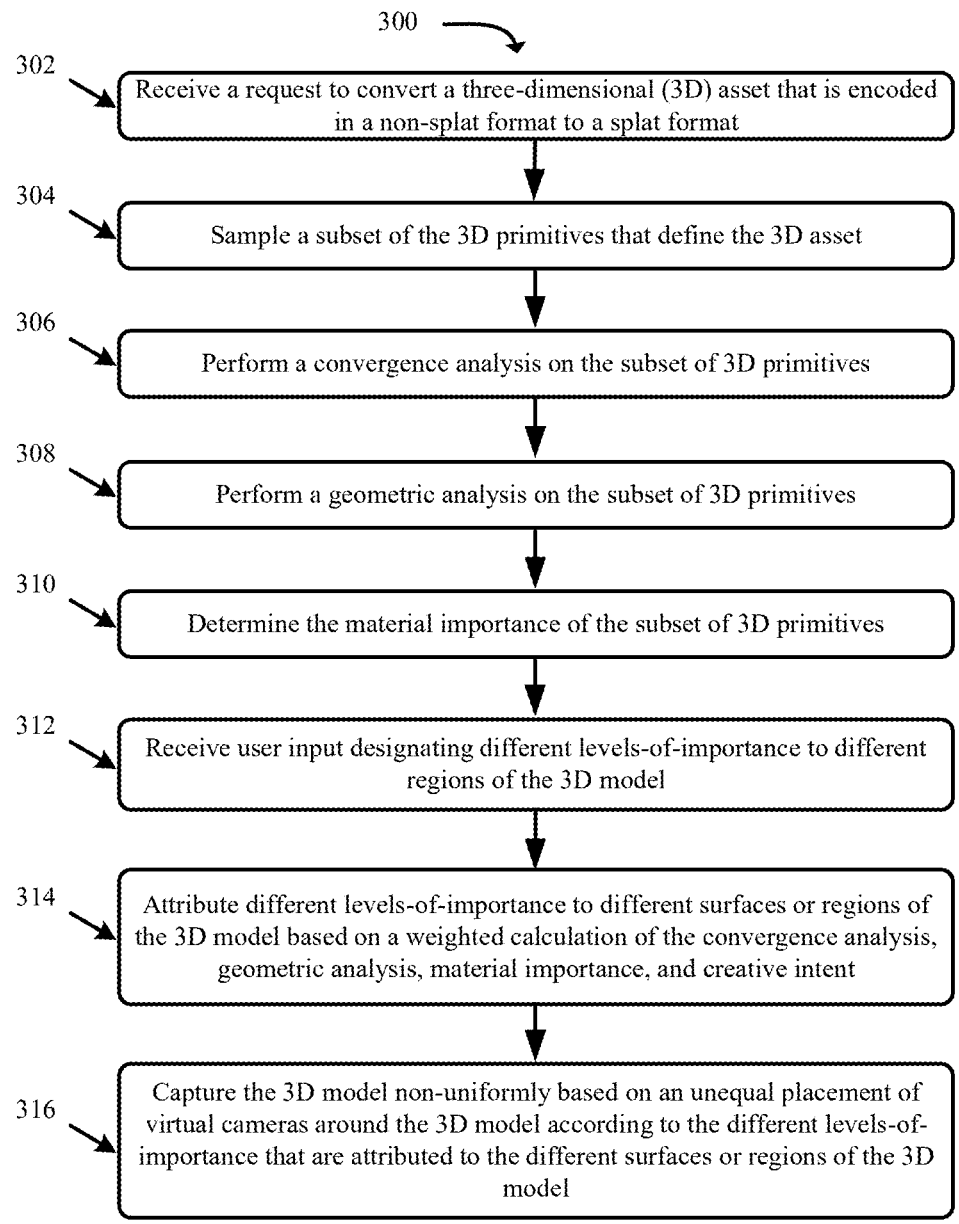
FIG. 3 presents a process for dynamically determining different levels-of-importance for different surfaces or regions of a 3D model in accordance with some embodiments presented herein.

FIG. 3 presents a process 300 for dynamically determining different levels-of-importance for different surfaces or regions of a 3D model in accordance with some embodiments presented herein. Process 300 is implemented by splat generation system 200.

Splat generation system 200 includes one or more devices or machines with processor, memory, storage, network, rendering, and/or other hardware resources for the generation and conversion of 3D assets or 3D content. In some embodiments, splat generation system 200 may be part of a streaming platform that streams splat representations of 3D content over a data network to facilitate a real-time or on-demand viewing of the 3D content. In some other embodiments, splat generation system 200 is part of a spatial computing, gaming, or other 3D platform that generates splat representations of 3D models for viewing on local or remote devices.

Process 300 includes receiving (at 302) a request to convert a 3D asset that is encoded in a non-splat format to a splat format (e.g., a Gaussian splat representation). The request may include a copy of or link to the 3D asset encoded in the non-splat format. A mesh encoding of the 3D asset may be defined with 3D primitives that form a connected set of meshes. A point cloud encoding of the 3D asset may be defined with 3D primitives that correspond to a disconnected set of points that are distributed about a 3D space.

Process 300 includes sampling (at 304) a subset of the 3D primitives that define the 3D asset. In some embodiments, the sampling (at 304) may include selecting fewer than all the 3D primitives that form different surfaces or regions of the 3D asset and obtaining the positional and visual characteristic values that are defined for the subset of 3D primitives. For instance, the sampling (at 304) may include selecting 10 of a 100 neighboring 3D primitives that form a common surface. In some other embodiments, the subset of 3D primitives may correspond to all surface or unobstructed 3D primitives of the 3D asset.

Process 300 includes performing (at 306) a convergence analysis on the subset of 3D primitives. Performing (at 306) the convergence analysis may include determining the complexity of different surfaces or at different regions of the 3D asset based on positional variation amongst the subset of 3D primitives. For instance, the convergence analysis differentiates between flat and smooth surfaces of the 3D model and rough and jagged surfaces of the 3D model. The convergence analysis identifies important surfaces or regions of the 3D model as surfaces or regions that have significant positional variation in the 3D primitives that form those surfaces or regions, and identifies less important or unimportant surfaces or regions as surfaces or regions that have minor or no positional variation in the 3D primitives that form those surfaces or regions.

Process 300 includes performing (at 308) a geometric analysis on the subset of 3D primitives. Performing (at 308) the geometric analysis may include determining the importance of a surface or region based on the density of the 3D primitives forming that surface or that are positioned in that region, the complexity of the 3D primitive shapes (e.g., uniformly sized and sided polygons versus polygons of varying sizes and shapes), and/or variations in the 3D primitive surface normals. Rapid changes in the surface normals of neighboring 3D primitives may be indicative of a highly-detailed or important surface or region. Similarly, sharp edges, large angular deviation, and/or sudden cuts in the 3D primitives may also be indicative of a high-detailed or important surface or region.

Process 300 includes determining (at 310) the material importance of the subset of 3D primitives. The material importance may be derived from the frequency of one or more textures that are applied to the subset of 3D primitives. The textures may add visual differentiation or detail to the 3D primitives and, in so doing, increase the importance of the surface or region with those 3D primitives. The material importance of a 3D primitive may also be based on the visual characteristics of the 3D primitive. For instance, 3D primitives that are defined to be very specular may be determined (at 310) to have greater material importance than 3D primitives with little or no specular characteristics. Similarly, 3D primitives with high reflectivity or low opacity may be determined (at 310) to have greater material importance than 3D primitives with low reflectivity and high opacity.

Process 300 includes receiving (at 312) user input designating different levels-of-importance to different regions of the 3D model. The user input may be based on the creative intent of the 3D model creator. The user input specifies the regions-of-interest or the regions that they want viewers to focus on. As such, the user input specifies the regions where the detail or quality should be preserved or prioritized over other regions. The user input may be defined via manual region selections or programmatically by specifying criteria for identifying the regions-of-interest. The criteria may be based on the positioning of the 3D model in a field-of-view. For instance, lesser importance is associated with the 3D model when the 3D model is placed further in the background or periphery of the field-of-view.

Process 300 includes attributing (at 314) different levels-of-importance to different surfaces or regions of the 3D model based on a weighted calculation of the convergence analysis, geometric analysis, material importance, and/or creative intent. Attributing (at 314) the different levels-of-importance may include assigning a value to the 3D primitives that corresponds to the importance of a surface or region formed by those 3D primitives.

Process 300 includes capturing (at 316) the 3D model non-uniformly based on an unequal placement of virtual cameras around the 3D model according to the different levels-of-importance that are attributed (at 314) to the different surfaces or regions of the 3D model. The non-uniform capture (at 316) includes generating a set of images of the 3D model with varying amounts of coverage for the different surfaces or region from different perspectives based on the attributed (at 314) levels-of-importance. The images from the non-uniform capture become the training or reference data from which to generate the splat representation of the 3D model with varying amounts of detail.

Figure 4:
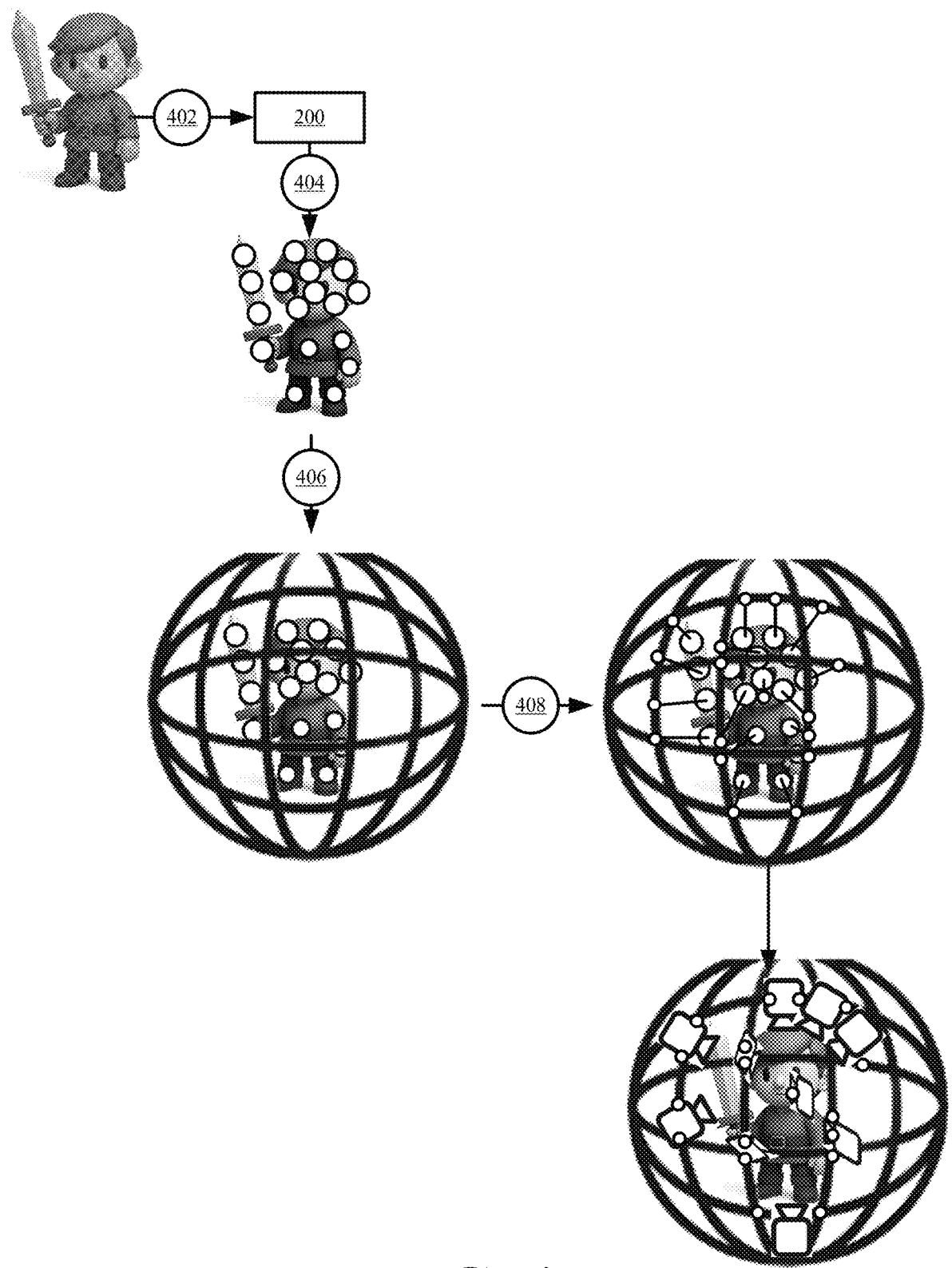
FIG. 4 illustrates an example for performing the selective non-uniform capture of a 3D model in accordance with some embodiments presented herein.

FIG. 4 illustrates an example for performing the selective non-uniform capture of a 3D model in accordance with some embodiments presented herein. Splat generation system 200 receives (at 402) and analyzes a 3D model to attribute (at 404) the different levels-of-importance to different surfaces or regions of the 3D model. In FIG. 4, the attributed (at 404) levels-of-importance are represented by the density of markers presented over the surfaces or regions of the 3D model with the greatest marker density identifying the surface or region that is determined to have the greatest importance.

Splat generation system 200 defines (at 406) an enclosing shape to surround the 3D model. The enclosing shape may be a sphere, cube, or other volume that surrounds the 3D model.

Splat generation system 200 maps (at 408) the determined levels-of-importance from the surface of the 3D model to the surface of the enclosing shape. In some embodiments, splat generation system 200 projects a ray from each marker on the 3D model surface to the enclosing shape surface. The direction of the ray may match the direction of the surface normal of the 3D primitive or 3D model surface where the ray is located.

Splat generation system 200 determines (at 410) an optimal placement for the virtual cameras about the enclosing shape based on a clustering of the mapped (at 408) levels-of-importance on the enclosing shape. Splat generation system 200 may perform a K-means or other clustering algorithm to locate concentrated regions of important detail and may position and orient the cameras to increase the coverage for the regions of increasing importance. The coverage of the 3D model surfaces or regions corresponds to the number of different perspectives with which those surfaces or regions are captured or how many different camera fields-of-view those surfaces or regions fall within. In other words, the coverage of a surface increases with each additional image of the 3D model that the surface falls within.

The coverage may be weighted or biased based on distance or offset angle at which the surface is captured in an image. For instance, a surface may have less coverage when it is in the periphery of a virtual camera field-of-view and more coverage when it is in the virtual camera field-of-view center. Accordingly, an off-angle or indirect capture of a surface may reduce the calculated surface coverage.

In some embodiments, splat generation system 200 may have a fixed number of virtual cameras to place around the enclosing shape in order to provide coverage for all regions of the 3D model with at least one virtual camera. Splat generation system 200 may place regions of increasing importance in the field-of-view of two or more cameras so as to obtain additional coverage and/or additional reference data for those regions against which to compare the generated splats.

In some other embodiments, splat generation system 200 may place any number or up to a maximum number of virtual cameras around the enclosing shape to obtain increasing amounts of coverage for regions that are associated with increased levels-of-importance. For instance, splat generation system 200 may position and orient a first set of virtual cameras for an equal first amount of coverage for all regions of the 3D model. Splat generation system 200 may then add virtual cameras to provide additional coverage for the regions of increasing importance. Splat generation system 200 may optimize the placement and orientation of the additional virtual cameras and the first set of cameras to provide the additional coverage for neighboring or adjacent regions of higher importance with the least total number of virtual cameras.

In some embodiments, splat generation system 200 may call an optimization function for the placement and orientation of the enclosing shape cameras. In some embodiments, splat generation system 200 may invoke an objective function that calculates the distance between each marker on the 3D model and the cameras about the enclosing shape, and splat generation system 200 may reposition and reorient the cameras to minimize the total distance while obtaining the correct coverage based on the levels-of-importance associated with the different surfaces or regions of the 3D model.

Splat generation system 200 may obtain the reference image data that is used for the splat generation based on the determined optimal placement of the virtual cameras about the enclosing shape. Surfaces or regions associated with higher levels-of-importance are captured closer to the center of a greater number of images to provide multiple closer perspectives for the visual detail of those surfaces or regions, surfaces or regions associated with lower levels-of-importance are captured in a decreasing number of images (e.g., fewer perspectives) and/or farther from the image center, and/or surfaces or regions associated with the lowest level-of-importance may be captured in a single image and/or in the periphery of that single image.

Figure 5:
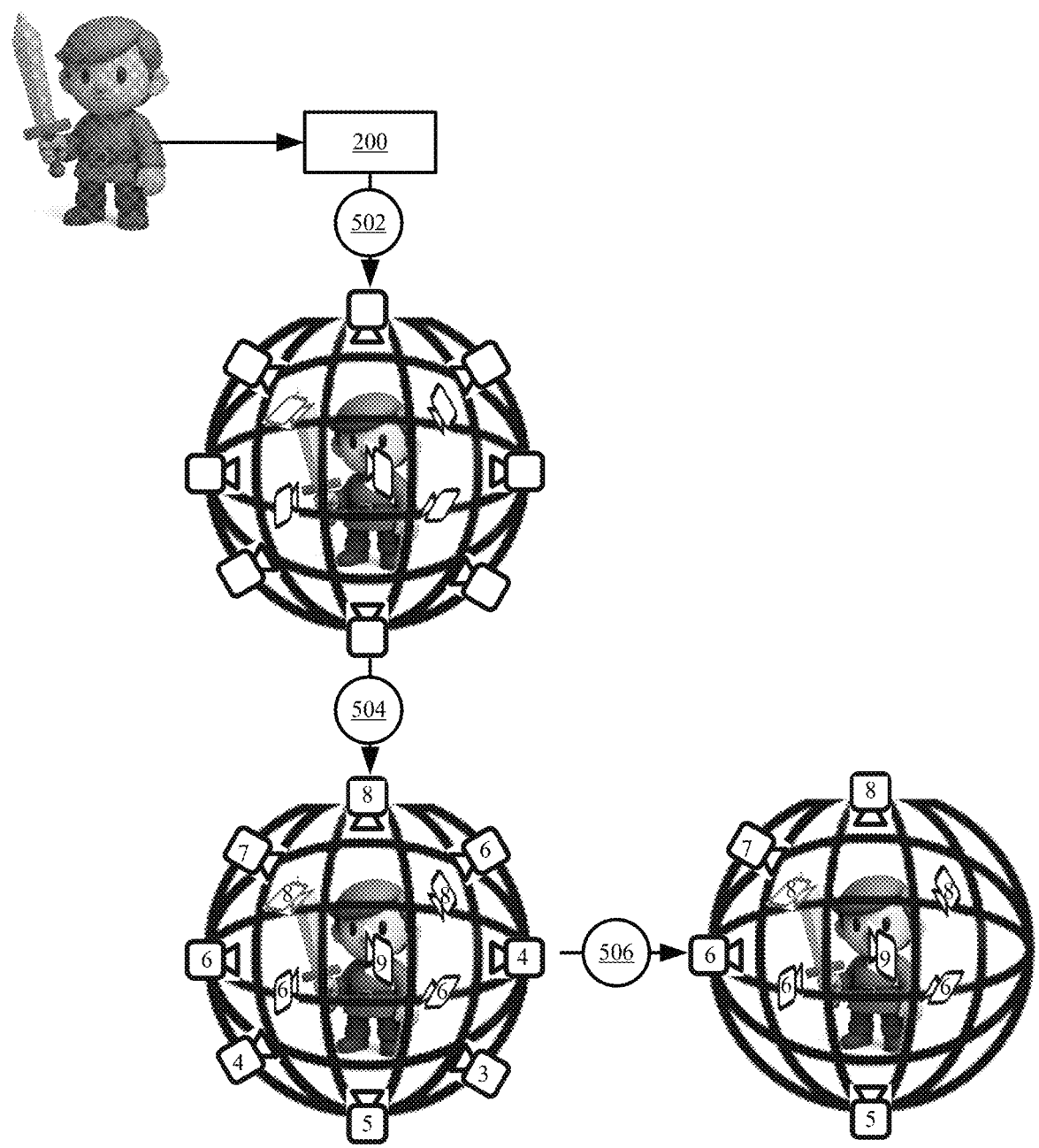
FIG. 5 illustrates an example of a subtractive placement of cameras for the non-uniform capture of a 3D model in accordance with some embodiments presented herein.

FIG. 5 illustrates an example of a subtractive placement of cameras for the non-uniform capture of a 3D model in accordance with some embodiments presented herein. Splat generation system 200 defines an enclosing shape to surround the 3D model and equally distributes (at 502) virtual cameras about the enclosing shape.

Splat generation system 200 scores (at 504) the coverage of each camera using an objective function. The scoring (at 504) may include providing a value for the number of surfaces or regions within the camera field-of-view and the importance of those surfaces or regions. The importance of the 3D model surfaces or regions may be determined based on one or more of the coverage, geometric, material, and/or creative analysis described with reference to FIG. 3. The scoring (at 504) may further include adjusting the value according to the position of the surfaces or regions in the field-of-view where surfaces or regions in the field-of-view center are valued greater than surfaces or regions in the field-of-view periphery.

Splat generation system 200 selectively removes (at 506) cameras from the enclosing shape that provide the worst coverage (e.g., that are scored the lowest) until the remaining cameras provide a desired amount of coverage for all surfaces. In some embodiments, splat generation system 200 selectively removes (at 506) a set number of cameras or performs the selective removal until a particular number of optimally placed cameras remain.

In some embodiments, splat generation system 200 may scatter the cameras about the enclosing shape, score the camera placement based on surfaces that are not seen or in a camera field-of-view and further based on the importance of those surfaces. In some such embodiments, the scoring of the camera placement accounts for missed coverage with the optimal camera placement minimizing or reducing the amount of missed coverage.

Splat generation system 200 may obtain better coverage and/or use fewer cameras to obtain a desired 3D model coverage when the camera placement is not restricted to the surface of the enclosing shape. In other words, splat generation system 200 may be free to place the cameras anywhere and at any distance from the 3D model in order to optimize for the coverage of the surfaces with the different levels-of-importance.

Figure 6:
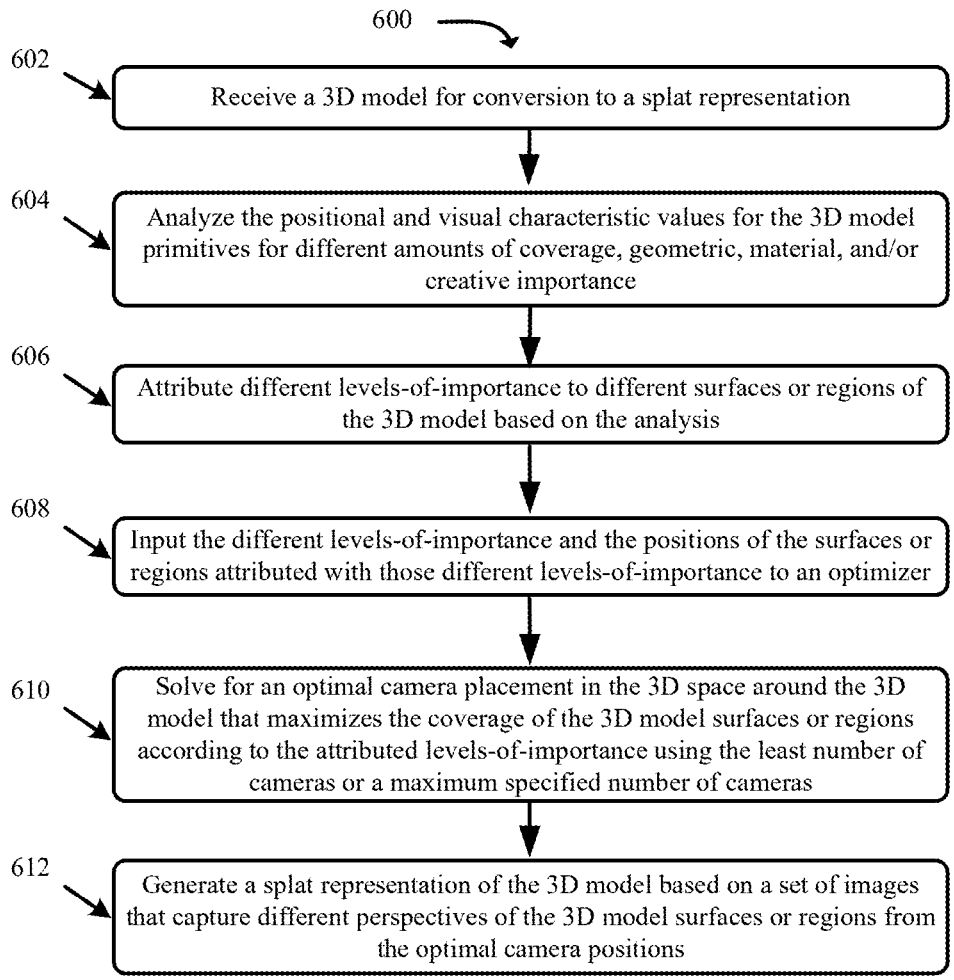
FIG. 6 presents a process for the unconstrained camera placement for the selective non-uniform capture of a 3D model in accordance with some embodiments presented herein.

FIG. 6 presents a process 600 for the unconstrained camera placement for the selective non-uniform capture of a 3D model in accordance with some embodiments presented herein. Process 600 is implemented by splat generation system 200.

Process 600 includes receiving (at 602) a 3D model for conversion to a splat representation. The 3D model may be uploaded or retrieved from storage. Alternatively, the 3D model may be selected to include as part of a 3D environment or 3D content that is to be streamed over a data network to different client devices, and the selected 3D model may not be streamed or may not be optimized for streaming in its current non-splat format.

Process 600 includes analyzing (at 604) the positional and visual characteristic values for the 3D model primitives for different amounts of coverage, geometric, material, and/or creative importance. The analysis (at 604) includes determining the level-of-importance associated with different formed surfaces or regions of the 3D model based on the variation or commonality in the values of neighboring primitives, the density of the primitives forming the different surfaces or in the different regions, and/or the frequency or complexity of the texture that is applied to the primitives.

Process 600 includes attributing (at 606) different levels-of-importance to different surfaces or regions of the 3D model based on the analysis (at 604). The different levels-of-importance may be numeric values that are added to the 3D model primitive definitions or to groups of primitives that form different surfaces or that are in different regions of the 3D model. In some embodiments, the different levels-of-importance specify an amount of detail to preserve from the primitives, surfaces, or regions attributed with the different levels-of-importance. In some embodiments, the different levels-of-importance correspond to different amounts of coverage or a different number of perspectives for surfaces or regions associated with those different levels-of-importance.

Process 600 includes inputting (at 608) the different levels-of-importance and the positions of the surfaces or regions attributed with those different levels-of-importance to an optimizer. In some embodiments, splat generation system 200 uses PyTorch, Tensor Flow, or another optimizer to determine the optimal camera placement for the given inputs. In some such embodiments, the inputs may also include a maximum number of cameras that may be placed to provide the desired coverage.

Process 600 includes solving (at 610) for an optimal camera placement in the 3D space around the 3D model that maximizes the coverage of the 3D model surfaces or regions according to the attributed levels-of-importance using the least number of cameras or a maximum specified number of cameras. The optimal camera placement may include placing some cameras closer to the 3D model surfaces and some cameras farther from the 3D model surfaces. For instance, a more distant camera placement may be sufficient to provide minimal or low detail coverage for a larger number of surfaces or regions of the 3D model that are associated with the lowest level-of-importance. In some embodiments, a close-up placement of a camera may capture high levels of details from surfaces or regions that are associated with higher levels-of-importance without the need for coverage by two or more cameras. In some other embodiments, it may be more optimal to place two cameras farther away from the 3D model to obtain multiple perspectives that together provide the desired coverage for different surfaces or regions.

Process 600 includes generating (at 612) a splat representation of the 3D model based on a set of images that capture different perspectives of the 3D model surfaces or regions from the optimal camera positions. Generating (at 612) the splat representation includes generating splats to reconstruct the 3D model surfaces or regions with an amount of detail that matches the detail captured for those same surfaces or regions in the set of images, wherein surfaces or regions associated with lower levels-of-importance may be captured in the images with less detail and less overall coverage than surfaces or regions associated with higher levels-of-importance.

Figure 7:
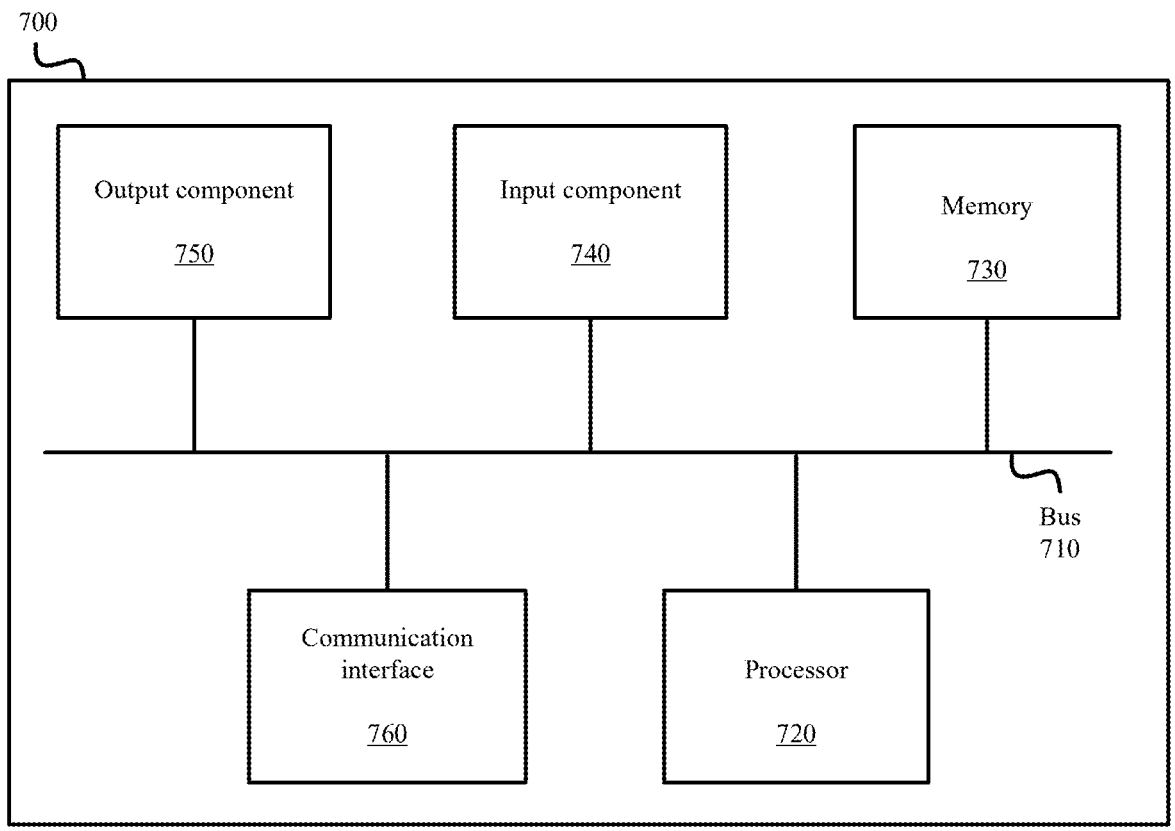
FIG. 7 illustrates example components of one or more devices, according to one or more embodiments described herein.

FIG. 7 is a diagram of example components of device 700. Device 700 may be used to implement one or more of the tools, devices, or systems described above (e.g., splat generation system 200). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving a three-dimensional (3D) model, the 3D model comprising a plurality of 3D primitives that are each defined with a position and visual characteristics;
   analyzing variation in one or more of the position and the visual characteristics of the plurality of 3D primitives;
   attributing different levels-of-importance to different surfaces or regions of the 3D model represented by different sets of the plurality of 3D primitives based on the variation;
   defining a non-uniform placement of a plurality of cameras around the 3D model that provides different amounts of coverage for the different surfaces or regions according to the different levels-of-importance that are attributed to the different surfaces or regions; and
   generating a plurality of splats for a splat encoding of the 3D model, wherein generating the plurality of splats comprises defining different sets of splats that reconstruct the different surfaces or regions with differing amounts of detail based on differing amounts of detail that are captured for the different surfaces or regions in images generated from the non-uniform placement of the plurality of cameras.

2. The method of claim 1 further comprising:
   generating the images that capture the different surfaces and regions of the 3D model from one or more perspectives using each camera of the plurality of cameras placed around the 3D model according to the non-uniform placement.

3. The method of claim 1 further comprising:
   defining an enclosing shape that surrounds the 3D model; and
   placing the plurality of cameras about the enclosing shape according to the non-uniform placement, wherein each camera of the plurality of cameras is a virtual camera.

4. The method of claim 3, wherein the enclosing shape is a sphere.

5. The method of claim 1, wherein defining the different sets of splats comprises:
   defining a first set of splats that form a first surface or region of the 3D model with a first amount of detail based on the first surface or region being attributed with a first level-of-importance; and
   defining a second set of splats that form a different second surface or region of the 3D model with a second amount of detail based on the different second surface or region being attributed with a second level-of-importance, wherein the second amount of detail is less than the first amount of detail.

6. The method of claim 5, wherein first set of splats comprises a more dense clustering of smaller-sized splats than the second set of splats.

7. The method of claim 1, wherein defining the different sets of splats comprises:
   defining a first set of splats that form a first surface or region of the 3D model to match a first amount of detail from a first set of images that capture the first surface or region from a first set of perspectives; and defining a second set of splats that form a different second surface or region of the 3D model to match a second amount of detail from a single image of the first set of images that captures the different second surface or region, wherein the second amount of detail is less than the first amount of detail.

8. The method of claim 1, wherein analyzing the variation comprises determining that a first set of 3D primitives from the plurality of 3D primitives form a flat or smooth surface of the 3D model and that a second set of 3D primitives from the plurality of 3D primitives form a jagged or non-smooth surface of the 3D model; and wherein attributing the different levels-of-importance comprises attributing a higher level-of-importance to the second set of 3D primitives or the jagged or non-smooth surface of the 3D model than to the first set of 3D primitives or the flat or smooth surface of the 3D model.

9. The method of claim 1, wherein analyzing the variation comprises determining that a first set of 3D primitives from the plurality of 3D primitives form a first surface of the 3D model that has greater color variation than a second set of 3D primitives from the plurality of 3D primitives that form a second surface of the 3D model; and wherein attributing the different levels-of-importance comprises attributing a higher level-of-importance to the first set of 3D primitives or the first surface of the 3D model than to the second set of 3D primitives or the second surface of the 3D model.

10. The method of claim 1 further comprising:

wherein analyzing the variation comprises determining a response complexity for a material associated with a particular set of 3D primitives from the plurality of 3D primitives; and wherein attributing the different levels-of-importance comprises attributing a first level-of-importance to the particular set of 3D primitives based on the material being associated a first response complexity and attributing a second level-of-importance to the particular set of 3D primitives based on the material being associated with a different second material response complexity.

11. The method of claim 1, wherein the plurality of 3D primitives correspond to a plurality of meshes or a plurality of points that define a form and visual characteristics of the 3D model.

12. The method of claim 1, wherein defining the non-uniform placement comprises:

sampling an attributed level-of-importance associated with each of the different surfaces or region to an enclosing shape that surrounds the 3D model;

identifying clusters based on sampling to the enclosing shape; and placing a camera from the plurality of cameras at each of the clusters.

13. The method of claim 1, wherein defining the non-uniform placement comprises:

defining positions for the plurality of cameras around the 3D model; and selectively removing one or more cameras from the plurality of cameras in response to the one or more cameras providing extraneous coverage for the different surfaces or regions based on the different levels-of-importance attributed to the different surfaces or regions and coverage that is provided by other cameras of the plurality of cameras.

14. The method of claim 1, wherein defining the non-uniform placement comprises:

determining different amounts of coverage to provide to the different surfaces or regions based on the different levels-of-importance attributed to the different surfaces or regions; and placing the plurality of cameras around the 3D model that provide the different amounts of coverage to the different surfaces or regions.

15. A splat generation system comprising:

one or more hardware processors configured to:

receive a three-dimensional (3D) model, the 3D model comprising a plurality of 3D primitives that are each defined with a position and visual characteristics;

analyze variation in one or more of the position and the visual characteristics of the plurality of 3D primitives;

attribute different levels-of-importance to different surfaces or regions of the 3D model associated with different sets of the plurality of 3D primitives based on the variation;

define a non-uniform placement of a plurality of cameras around the 3D model that provides different amounts of coverage for the different surfaces or regions according to the different levels-of-importance that are attributed to the different surfaces or regions; and generate a plurality of splats for a splat encoding of the 3D model, wherein generating the plurality of splats comprises defining different sets of splats that reconstruct the different surfaces or regions with differing amounts of detail based on differing amounts of detail that are captured for the different surfaces or regions in images generated from the non-uniform placement of the plurality of cameras.

16. The splat generation system of claim 15, wherein the one or more hardware processors are further configured to:

generate the images that capture the different surfaces and regions of the 3D model from one or more perspectives using virtual cameras placed around the 3D model according to the non-uniform placement.

17. The splat generation system of claim 15, wherein the one or more hardware processors are further configured to:

define an enclosing shape that surrounds the 3D model; and place a plurality of virtual cameras about the enclosing shape according to the non-uniform placement.

18. The splat generation system of claim 17, wherein the enclosing shape is a sphere.

19. The splat generation system of claim 15, wherein defining the different sets of splats comprises:

defining a first set of splats that form a first surface or region of the 3D model with a first amount of detail based on the first surface or region being attributed with a first level-of-importance; and defining a second set of splats that form a different second surface or region of the 3D model with a second amount of detail based on the different second surface or region being attributed with a second level-of-importance, wherein the second amount of detail is less than the first amount of detail.

20. A non-transitory computer-readable medium storing instructions that, when executed by one or more processors of a splat generation system, cause the splat generation system to perform operations comprising:

receiving a three-dimensional (3D) model, the 3D model comprising a plurality of 3D primitives that are each defined with a position and visual characteristics;

analyzing variation in one or more of the position and the visual characteristics of the plurality of 3D primitives;

attributing different levels-of-importance to different surfaces or regions of the 3D model associated with different sets of the plurality of 3D primitives based on the variation;

defining a non-uniform placement of a plurality of cameras around the 3D model that provides different amounts of coverage for the different surfaces or regions according to the different levels-of-importance that are attributed to the different surfaces or regions; and generating a plurality of splats for a splat encoding of the 3D model, wherein generating the plurality of splats comprises defining different sets of splats that reconstruct the different surfaces or regions with differing amounts of detail based on differing amounts of detail that are captured for the different surfaces or regions in images generated from the non-uniform placement of the plurality of cameras.

* * * * *